(12) United States Patent
Sun et al.

(10) Patent No.: US 7,957,375 B2
(45) Date of Patent: Jun. 7, 2011

(54) APPARATUS AND METHOD FOR POLICY ROUTING

(75) Inventors: Yongle Sun, Shenzhen (CN); Xia Chen, Shenzhen (CN); Wen Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 12/256,892

(22) Filed: Oct. 23, 2008

(65) Prior Publication Data
US 2009/0046718 A1    Feb. 19, 2009

Related U.S. Application Data

(63) Continuation of application No. PCT/CN2006/003105, filed on Nov. 17, 2006.

(30) Foreign Application Priority Data

Apr. 26, 2006   (CN) .......................... 2006 1 0076457

(51) Int. Cl.
*H04L 12/28* (2006.01)
*H04L 12/56* (2006.01)
*H04L 12/66* (2006.01)
*G06F 15/173* (2006.01)

(52) U.S. Cl. ......... 370/389; 370/352; 370/392; 709/223

(58) Field of Classification Search .......... 370/238–254, 370/389–392, 395–401; 709/223–229
See application file for complete search history.

(56) References Cited

U.S. PATENT DOCUMENTS

| 7,035,259 B2 * | 4/2006 | Nomura et al. | 370/392 |
| 7,082,102 B1 * | 7/2006 | Wright | 370/229 |
| 7,206,309 B2 * | 4/2007 | Pegrum et al. | 370/389 |
| 7,325,071 B2 * | 1/2008 | Krishnan | 709/238 |
| 7,342,874 B2 * | 3/2008 | Pegrum et al. | 370/218 |

(Continued)

FOREIGN PATENT DOCUMENTS

CN    1412989 A    4/2003

(Continued)

OTHER PUBLICATIONS

Cisco, "MPLS VPN—VRF Selection Using Policy Based Routing," Internet Article, 2003 http://web.archive.org/web/20060822193504/www.cisco.com/univercd/cc/td/doc/product/software/ios122s/122snwft/release/122s25/fs_pbrsv.pdf [retrieved on Jul. 8, 2009].

(Continued)

*Primary Examiner* — Man Phan

(57) ABSTRACT

An apparatus and method for policy routing is provided. The method includes: A. configuring a policy routing to a label switching path and obtaining and saving forwarding information; and B. performing packet forwarding based on the forwarding information. The apparatus includes: a label switching path managing unit, for saving first forwarding information of the label switching path; a route managing unit, for saving second forwarding information of the label switching path; a configuring unit, for transmitting configuration parameters to the label switching path managing unit, and obtaining the first and/or second forwarding information of the label switching path from the label switching path managing unit and/or route managing unit; a forwarding information maintenance unit, for maintaining the first and second forwarding information of the label switching path saved in a node of policy; and a packet forwarding unit, together with the forwarding information maintenance unit, for forwarding the packet, which solves the problem that the prior art couldn't well support strategic route for a MPLS packet.

7 Claims, 8 Drawing Sheets

U.S. PATENT DOCUMENTS

| | | | | |
|---|---|---|---|---|
| 7,539,741 | B2 * | 5/2009 | Liong et al. | 709/223 |
| 7,801,149 | B1 * | 9/2010 | France | 370/395.21 |
| 2001/0019554 | A1 | 9/2001 | Nomura et al. | |
| 2003/0053464 | A1 * | 3/2003 | Chen et al. | 370/400 |
| 2004/0218535 | A1 | 11/2004 | Liong et al. | |
| 2006/0039364 | A1 * | 2/2006 | Wright | 370/352 |
| 2010/0061366 | A1 * | 3/2010 | DelRegno et al. | 370/389 |
| 2010/0103815 | A1 * | 4/2010 | Kotrla et al. | 370/229 |
| 2010/0235914 | A1 * | 9/2010 | Proulx | 726/23 |

FOREIGN PATENT DOCUMENTS

| | | |
|---|---|---|
| CN | 1601966 A | 3/2005 |
| CN | 1738288 A | 2/2006 |
| CN | 1744563 A | 3/2006 |
| JP | 2005-072906 A | 3/2005 |

OTHER PUBLICATIONS

Communication pursuant to Article 94(3) EPC dated Sep. 8, 2009 in connection with European Patent Application No. 06 817 845.8.

Partial Translation of Office Action dated Mar. 6, 2009 in connection with Chinese Patent Application No. 200610076457.6.

Written Opinion of the International Searching Authority dated Mar. 8, 2007 in connection with International Patent Application No. PCT/CN2006/003105.

D. Awduche, et al., "Requirements for Traffic Engineering Over MPLS", The Internet Society, Sep. 1999, 26 pages.

"VRP Operation Manual IP Services Volume", Huawei Technology Proprietary, Chapter 6, 24 pages.

* cited by examiner

APPARATUS AND METHOD FOR POLICY ROUTING

CROSS-REFERENCE TO RELATED APPLICATIONS

This application is a continuation of International Patent Application No. PCT/CN2006/003105, filed Nov. 17, 2006, which claims priority to Chinese Patent Application No. 200610076457.6, filed Apr. 26, 2006, both of which are hereby incorporated by reference in their entirety.

FIELD OF THE INVENTION

The present disclosure relates to a field of communication technology, and to an apparatus and method for policy routing.

BACKGROUND

Traditional destination-based routing mechanism employs a routing table to forward packets, according to destination address. However, in this approach, a router can merely provide a single routing mode for users based on destination address of packets and solve the problem about forwarding network data, but cannot provide services for users to control the forwarding of packets.

In order to enable the routing function to have more powerful controlling capability and to be utilized more flexibly, a policy routing method has been adopted currently. The policy routing is defined as a kind of a routing mechanism, which forwards a data packet based on the user-defined policies. The user may select a forward path, according to a packet source address, a packet length and other criteria, besides a destination address. Implementing of policy routing may be defined according to actual application requirements, such as controlling a load balance among a plurality of routers, satisfying the quality of service (QoS) of packet forwarding in a single link, and the like. The policy routing includes interface policy routing and local policy routing. The interface policy routing is configured to forward packets reaching the interface, and the local policy routing is configured to perform policy routing on packets generated locally.

However, the policy routing method may influence the router in terms of transmitting local packets and forwarding packets from the interface. That is to say, when a user employs the method for policy routing to transmit or forward packets, the user needs to firstly search for a nodes of policy to determine whether there is a policy node matching the packet or not. If a policy node matched the packet is obtained, the packet is transmitted according to forwarding information described in the node of policy; and if no matched node of policy is obtained, the packet is transmitted or forwarded according to a conventional routing approach. When the matched policy node is obtained, the method can enhance the transmitting and forwarding efficiencies; and when no matched node of policy is obtained, the method may reduce the transmitting and forwarding efficiencies. That is because certain comparison time is required for traversing and matching the nodes of policy, and the efficiency reduction extent is in a linear relation with the policy routing scale configured by the user, i.e. the number of nodes of policy. Under general conditions, the policy routing scale configured by the user is very small, and the number of policy nodes is no more than 200, and thus the packet transmitting and forwarding efficiencies are influenced in a rather small extent.

At present, the conventional policy routing approach includes a policy routing to an outgoing interface and a policy routing to a next-hop, in which a command line interface is provided, so that the user is enabled to manually intervene the forwarding of some packets. For example, according to a packet type, a source address or destination address, a packet size, and other information, the outgoing interface or the next-hop may be selected flexibly to instruct the motion of forwarding a packet. The policy routing configuration includes defining conditions for a packet requiring the policy routing and designating an outgoing interface and next-hop for a packet satisfying the conditions. To forward a packet, the router firstly searches for a matched node of policy, and if no matched node of policy is obtained, the router searches for the routing according to a destination address based on the conventional routing approach; and if a matched node of policy is obtained, the router firstly sets a priority level for the packet according to the priority level set by the user, and then determines whether the user has set a transmission interface of the policy routing or not. If the user has set the transmission interface, the packet is transmitted via the interface set by the user; and if the user does not set the transmission interface, it is further determined whether the user has set a next-hop of the policy routing or not. If the user has set the next-hop of the policy routing, the packet is transmitted to the next-hop; otherwise, a routing is searched for according to a destination address of the packet based on the conventional routing approach. If no node of policy matching the routing is obtained, the packet is transmitted to a default transmission interface set by the user; if the user does not set the default transmission interface, the packet is transmitted to a default next-hop; and if the user does not set the default next-hop of the policy routing, the packet is dropped.

According to the study on the aforementioned technologies, the inventor finds out the following technical problems: the method of policy routing to an outgoing interface or policy routing to a next-hop is merely applicable to policy routing of internet protocol (IP) packets, but cannot well support policy routing of other kinds of packets, for example, policy routing of multi-protocol label switching (MPLS) packets. In addition, the method of policy routing to an outgoing interface cannot be applicable to an Ethernet interface, because the Ethernet interface is a broadcast-type interface, and a designated outgoing interface cannot obtain a hardware address of an opposite terminal. What's more, since an IP packet is forwarded hop by hop, the method of policy routing to an outgoing interface and policy routing to a next-hop can merely be configured to forward a packet by one hop. That is to say, after a packet is transmitted from a certain interface of the router, the subsequent forwarding motions of the packet cannot be planned any more, i.e. the subsequent forward paths of the packet cannot be predicted.

SUMMARY

The present disclosure is directed to a packet forwarding method and apparatus, which is suitable for solving the problem in the prior art that policy routing of packets (such as MPLS packets) other than IP packets cannot be well supported.

In order to achieve the aforementioned object, the present disclosure provides a method for policy routing, which includes the following steps: A. configuring a policy routing to a label switching path, obtaining and saving forwarding information; and B. forwarding a packet according to the forwarding information.

Furthermore, the present disclosure provides an apparatus for policy routing, which includes a label switching path managing unit, a route managing unit, a configuration unit, a forwarding information maintenance unit, and a packet forwarding unit.

The label switching path managing unit is adapted to save first forwarding information of a label switching path.

The route managing unit is adapted to save second forwarding information of the label switching path.

The configuration unit is connected to the label switching path managing unit and the route managing unit, respectively, and adapted to transmit configuration parameters to the label switching path managing unit, and obtain the first and/or second forwarding information of the label switching path from the label switching path managing unit and/or the route managing unit.

The forwarding information maintenance unit is connected to the label switching path managing unit, and adapted to maintain the first and second forwarding information of the label switching path saved in a node of policy.

The packet forwarding unit is adapted to forward a packet, together with the forwarding information maintenance unit.

The present disclosure not only supports policy routing of IP packets, but also supports policy routing of MPLS packets and is further applicable to an Ethernet interface. In addition, as for the policy routing to the LSP, the present disclosure not only supports to select a next-hop and an outgoing interface at a local router, but also supports all the subsequent forward paths of the packet. Meanwhile, the present disclosure can also refresh the forwarding information of policy routing to the LSP through a timer trigger mode or a LSP unit trigger mode, thereby enhancing packet forwarding efficiency.

BRIEF DESCRIPTION OF THE DRAWINGS

The present disclosure will become more fully understood from the detailed description given herein below for illustration only, and thus is not limitative of the present disclosure, and wherein.

DETAILED DESCRIPTION

The specific implementations of the present disclosure will be illustrated in detail below with reference to the accompanying drawings and embodiments.

Figure 1:
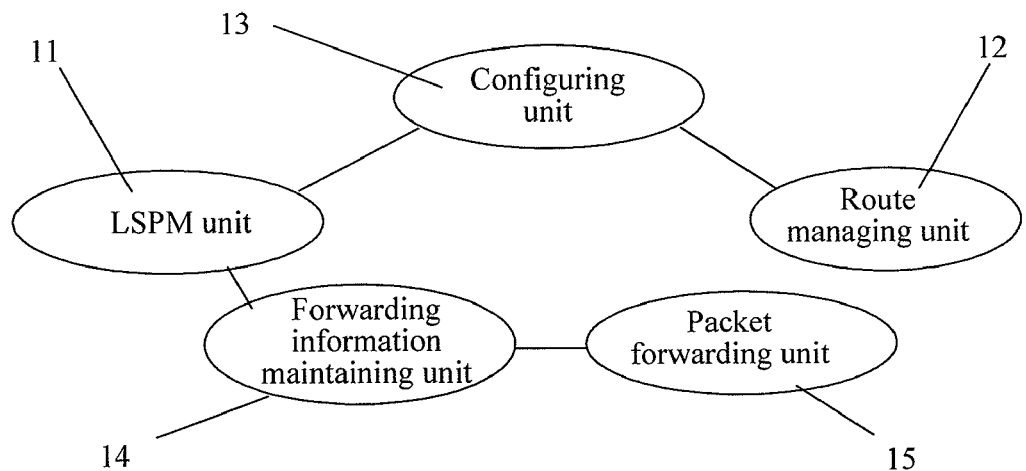
FIG. 1 is a diagram of an apparatus for policy routing, according to an embodiment.

FIG. 1 is a diagram of an apparatus for policy routing, according to an embodiment of the present disclosure. Referring to FIG. 1, the apparatus includes a label switching path managing (LSPM) unit 11, a route managing unit 12, a configuring unit 13, a forwarding information maintaining unit 14, and a packet forwarding unit 15. The configuring unit 13 is connected to the LSPM unit 11 and the route managing unit 12, respectively. The forwarding information maintaining unit 14 is connected to the LSPM unit 11 and the packet forwarding unit 15, respectively. The LSPM unit 11 is adapted to save first forwarding information of a label switching path (LSP), the first forwarding information includes an outer label, a forwarding egress, and next-hop information of the LSP. The route managing unit 12 is adapted to save second forwarding information of the LSP, the second forwarding information includes information about an inner label of the LSP. The configuring unit 13 communicates with the LSPM unit 11 and the route managing unit 12, respectively, transmits configuration parameters to the LSPM unit 11, and obtains the first and second forwarding information of the LSP from the LSPM unit 11 and/or the route managing unit 12. The forwarding information maintaining unit 14 is adapted to maintain the first and second forwarding information of the LSP saved in a node of policy. The packet forwarding unit 15 is adapted to forward a packet. In addition, as for a router forwarding packets via a network processor (NP), the apparatus further includes a hardware adaptation unit (not shown), connected to the LSPM unit 11 and the route managing unit 12 respectively, so as to provide a hardware adaptation for the saved forwarding information of the LSP.

Figure 2:
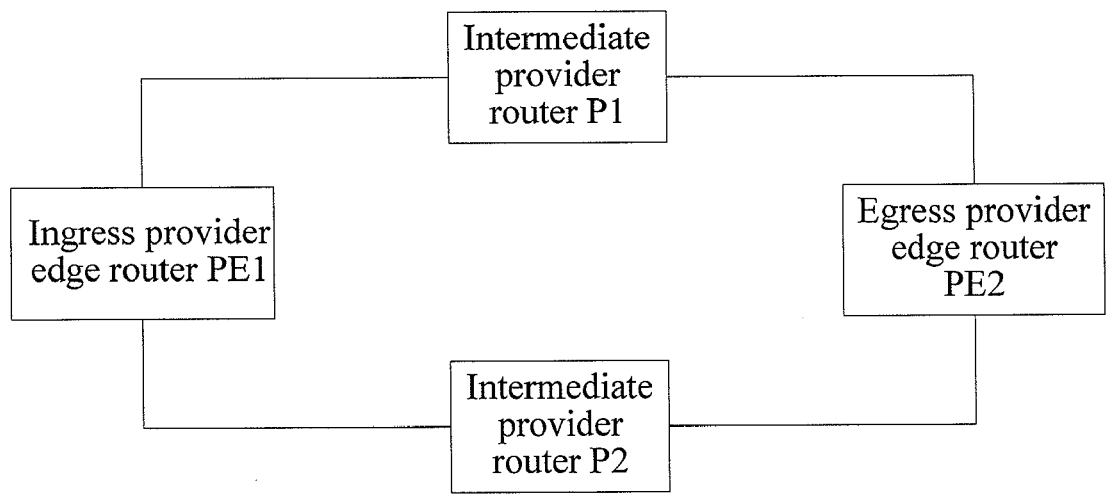
FIG. 2 is a network system diagram of the present disclosure when forwarding a public network packet.

FIG. 2 is a network system diagram according to a first embodiment of the present disclosure, i.e., when forwarding a public network packet. Referring to FIG. 2, the system is an MPLS network running a label distribute protocol (LDP), and includes a ingress provider edge router PE1, two intermediate provider routers P1 and P2, and an egress provider edge router PE2. The ingress provider edge router PE1 is connected to the intermediate provider routers P1 and P2 respectively; and the egress provider edge router PE2 is connected to the intermediate provider routers P1 and P2 respectively.

When the network system shown in FIG. 2 employs the apparatus for policy routing in FIG. 1, a method for policy routing of the present disclosure includes the following steps: firstly, configuring a policy routing to the LSP and saving forwarding information; then, refreshing the forwarding information of policy routing to the LSP through a timer trigger mode or an LSP unit trigger mode, in which the timer trigger mode is adopted in this embodiment; and forwarding the packet according to the forwarding information of policy routing to the LSP. If a certain port employs an LDP Fast Re-route (LDP FRR), that is, the port has a backup port, a backup LSP is established at the port, and the corresponding backup LSP of the port may be selected by displaying the configured policy routing to the LSP through commands. The backup LSP is not employed in this embodiment.

Figure 3:
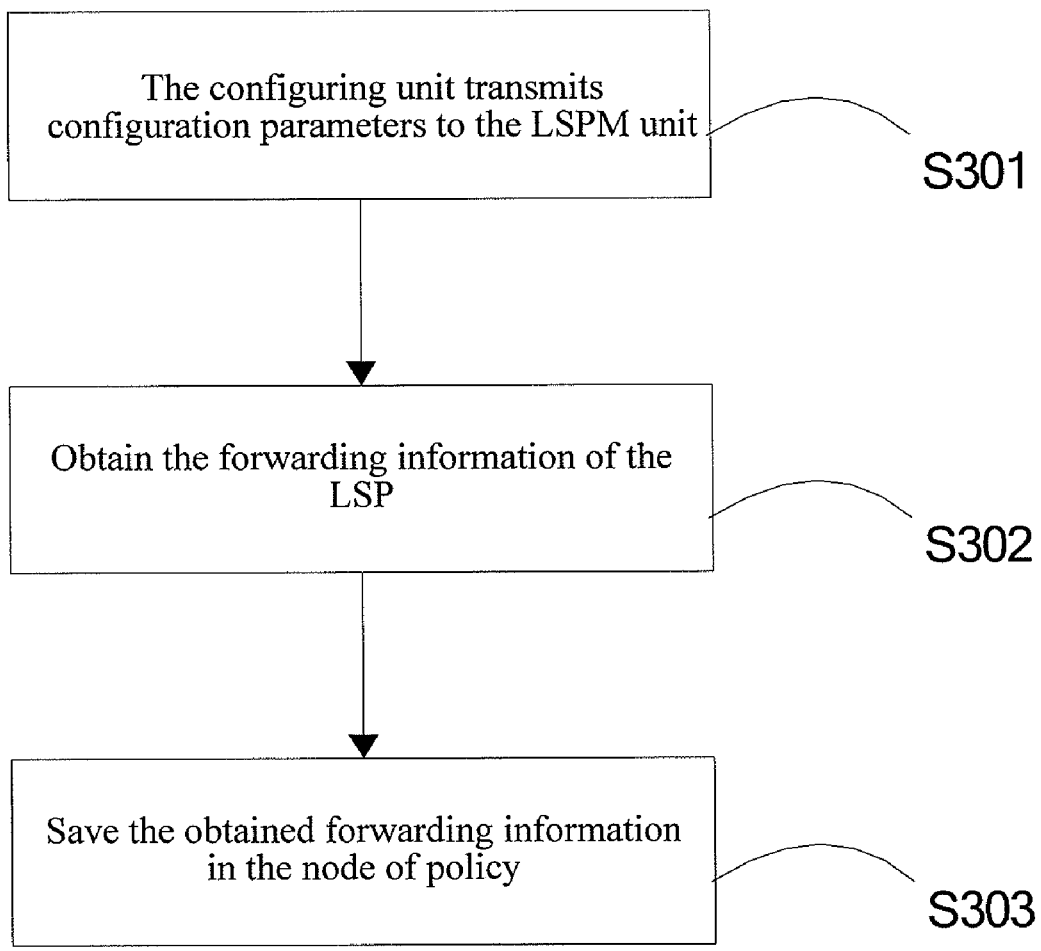
FIG. 3 is a flow chart of configuring a policy routing to a LSP, according to a first embodiment.

The present disclosure configures the policy routing to the LSP at the ingress provider edge router PE1. It is assumed that a packet is configured to be transmitted from the ingress provider edge router PE1 to the intermediate provider router P1, and then from the intermediate provider router P1 to the egress provider edge router PE2, the configuration flow is shown in FIG. 3. Referring to FIG. 3, the present disclosure includes the following steps.

In S301, the configuring unit transmits configuration parameters to the LSPM unit. That is, the configuring unit 13 transmits an address of the egress provider edge router PE2, an address of the intermediate provider router P1, and a parameter indicating whether the backup LSP is utilized or not to the LSPM unit 11.

In S302, forwarding information of the LSP is obtained. That is, according to the address of the egress provider edge router PE2, the address of the intermediate provider router P1, and the information indicating whether the backup LSP is utilized or not, the configuring unit 13 obtains an outer label, a forwarding egress, and next-hop information of the LSP from the LSPM unit 11.

In S303, the obtained forwarding information is saved in the node of policy. That is, the outer label, the forwarding egress, and the next-hop information of the LSP obtained from the LSPM unit 11 are saved in the ingress provider edge router PE1.

Figure 4:
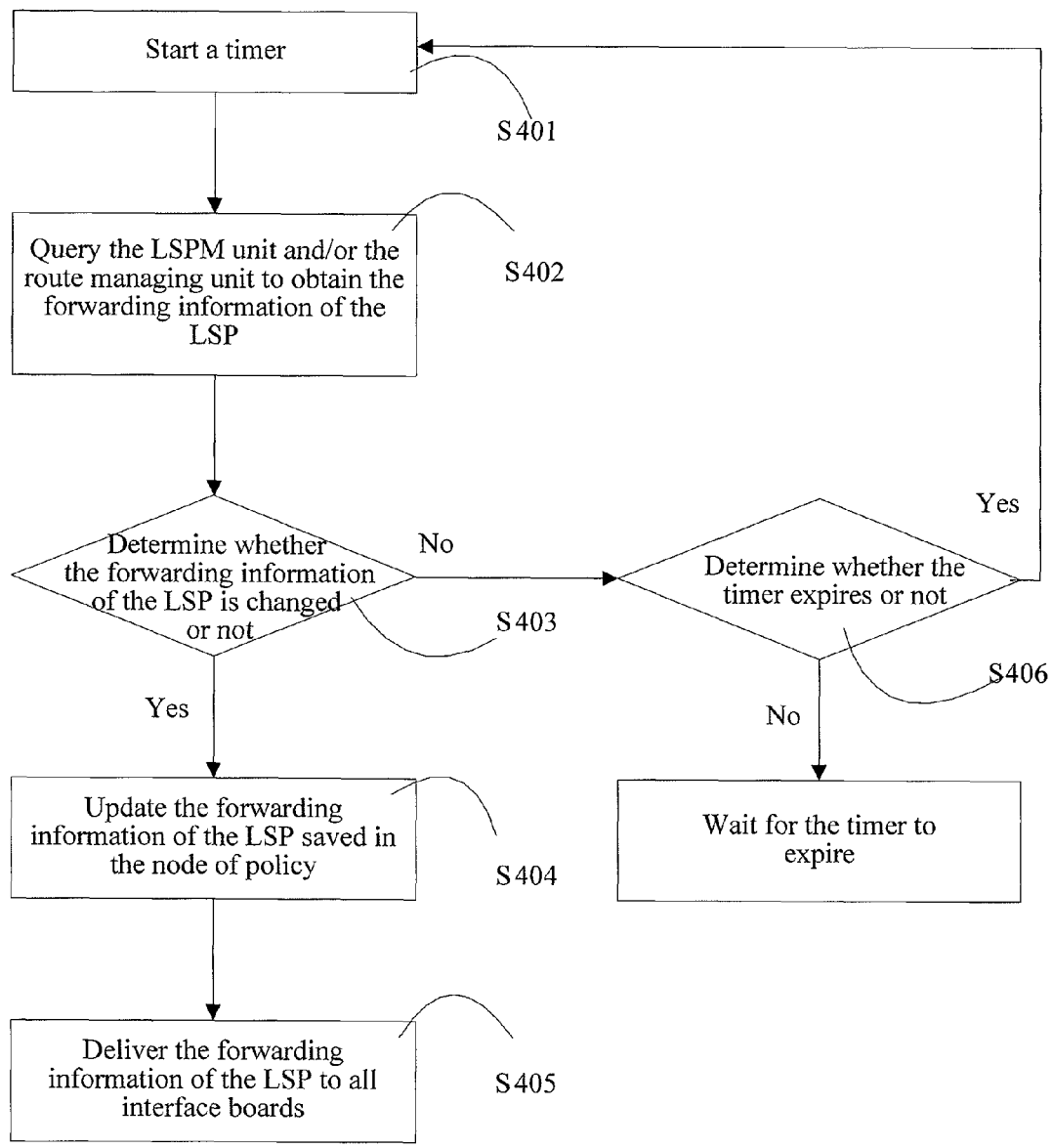
FIG. 4 is a flow chart of refreshing forwarding information of policy routing to the LSP, according to the first embodiment.

In order to enhance the packet forwarding efficiency, sufficient forwarding information needs to be saved of policy routing to the LSP, and the forwarding information dynamically changes with the changing of the network status. Therefore, when the network status is changed, the forwarding information needs to be refreshed accordingly. FIG. 4 is a flow chart of refreshing the forwarding information of policy routing to the LSP in the present disclosure, which employs the timer trigger mode. Referring to FIG. 4, the present disclosure includes the following steps.

In S401, a timer is started.

In S402, the LSPM unit and/or the route managing unit are queried to obtain the forwarding information of the LSP. For example, through querying the LSPM unit 11, the outer label, the forwarding egress, and the next-hop information of the LSP are obtained from the LSPM unit 11.

In S403, it is determined whether the forwarding information of the LSP is changed or not; if yes, the flow proceeds to Step S404, and otherwise, it proceeds to Step S406.

In S404, the forwarding information of the LSP saved in the node of policy is updated. That is, according to the outer label, the forwarding egress, and the next-hop information of the LSP obtained in Step S402, the forwarding information maintaining unit 14 updates the forwarding information of the LSP saved in the ingress provider edge router PE1.

In S405, the forwarding information of the LSP is delivered to all interface boards.

In S406, it is determined whether the timer expires or not; if yes, it proceeds to Step S401, and otherwise, it waits for the timer to expire.

In the embodiment of the present disclosure, the time interval for the refreshing motion, i.e. the set time of the timer, can be manually configured in consideration of network conditions. In order to increase the refreshing rate and save the CPU computation resources, the present disclosure calculates a statistical count for the policy routing to the LSP and gives an identifier of the statistical count. In addition, the process of creating and deleting the timer includes the following steps: when configuring the policy routing to the LSP, determine whether a timer exists or not; if yes, the timer does not need to be created, and otherwise, the timer is created; and when deleting the policy routing to the LSP, determine whether the policy routing contains information of the policy routing to the LSP or not; if yes, the timer is not deleted, and otherwise, the timer is deleted.

Figure 5:
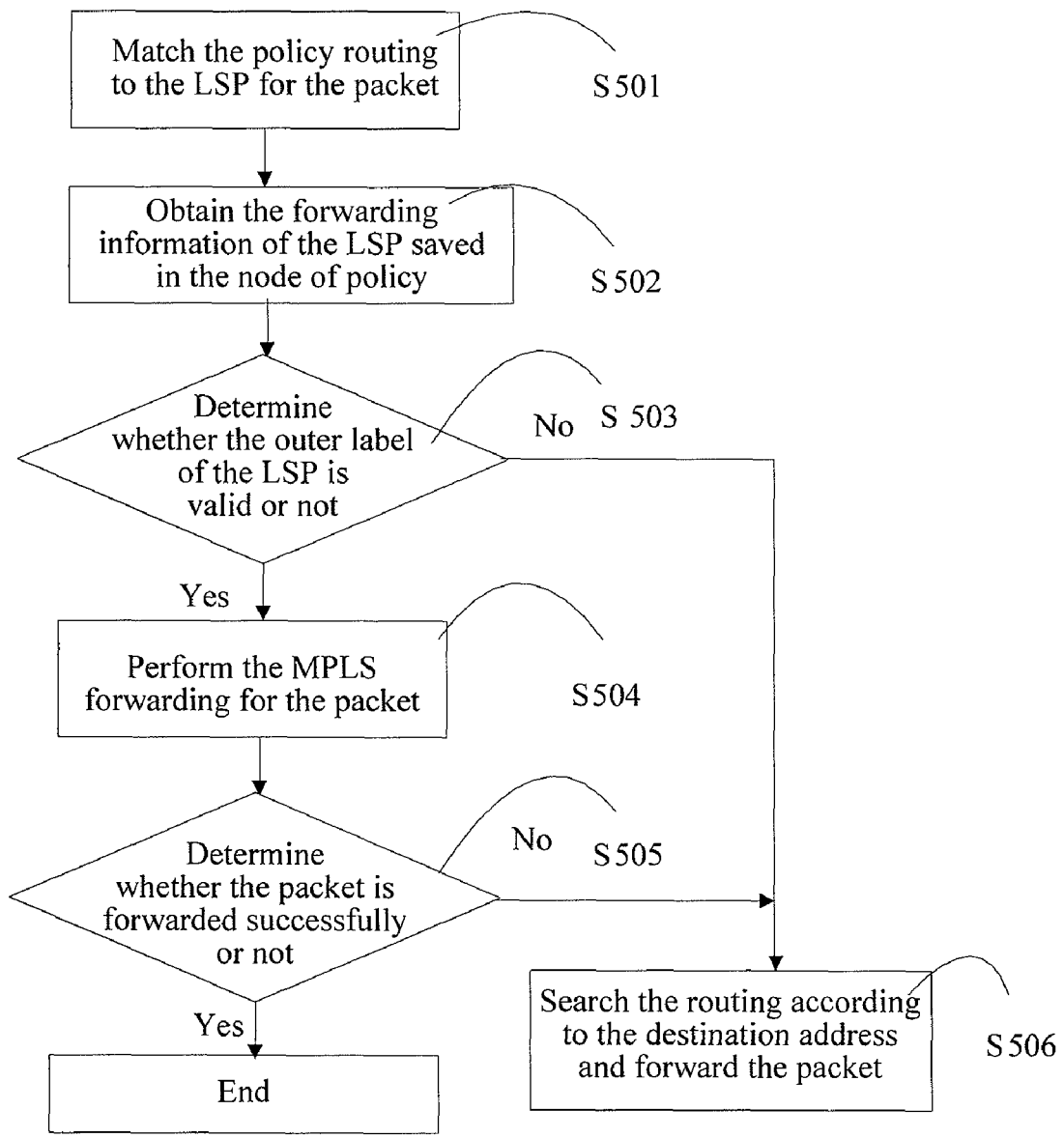
FIG. 5 is a flow chart of forwarding a packet, according to the first embodiment.

FIG. 5 is a flow chart of forwarding a packet, according to the present disclosure. Referring to FIG. 5, the present disclosure includes the following steps.

In S501, it matches the policy routing to the LSP for the packet. That is, the configuring unit 13 matches the policy routing to the LSP according to the packet type, the packet size, and the source address, in which if it matches successfully, the flow proceeds to Step S502, and otherwise, it proceeds to Step S506.

In S502, the forwarding information of the LSP saved in the node of policy is obtained. That is, the saved outer label, the forwarding egress, and the next-hop information of the LSP for the router are obtained from the ingress provider edge router PE1.

In S503, it is determined whether the outer label of the LSP is valid or not. If yes, the flow proceeds to Step S504, and otherwise, it proceeds to Step S506.

In S504, MPLS forwarding is performed for the packet. That is, the packet forwarding unit 15 forwards the packet from the ingress provider edge router PE1 to the intermediate provider router P1, and then from the intermediate provider router P1 to the egress provider edge router PE2.

In S505, it is determined whether the packet is forwarded successfully or not; if yes, the flow is ended, and otherwise, it proceeds to Step S506.

In S506, the routing is searched for according to a destination address, and the packet is forwarded.

Figure 6:
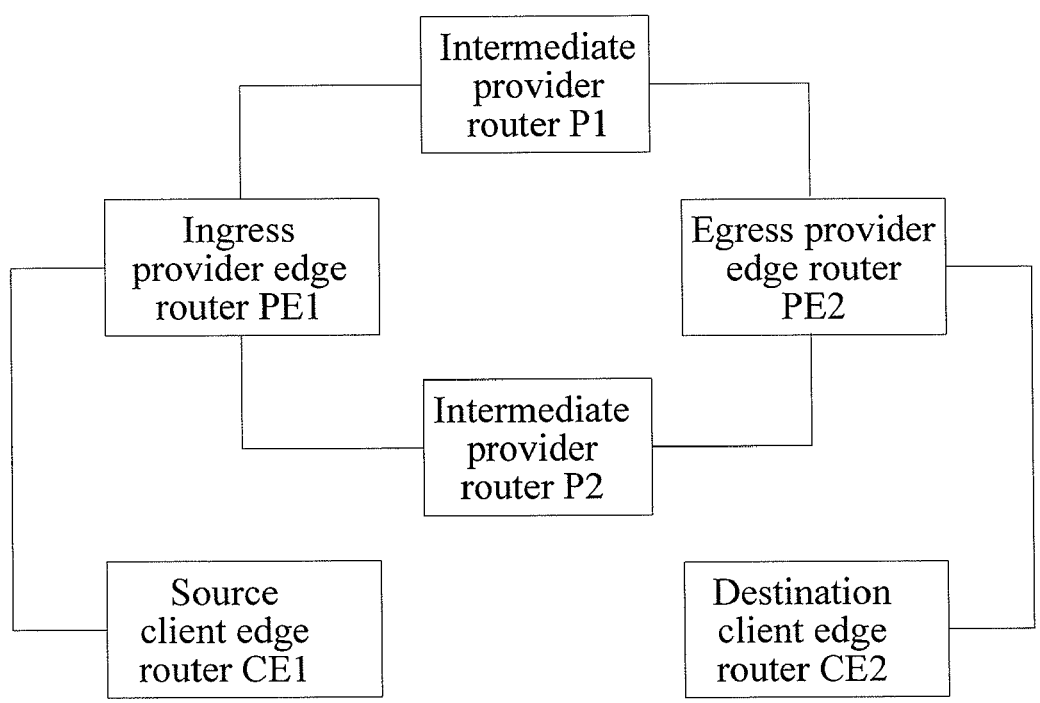
FIG. 6 is a network system diagram of the present disclosure when forwarding a private network packet.

Furthermore, FIG. 6 shows a network system according to a second embodiment of the present disclosure, i.e. when forwarding a private network packet. Referring to FIG. 6, the system is a MPLS network running a LDP protocol, and includes a source client edge router CE1, an ingress provider edge router PE1, two intermediate provider routers P1 and P2, an egress provider edge router PE2, and a destination client edge router CE2. The ingress provider edge router PE1 is connected to the source client edge router CE1 and the intermediate provider routers P1 and P2, respectively. The egress provider edge router PE2 is connected to the destination client edge router CE2 and the intermediate provider routers P1 and P2, respectively.

When the network system shown in FIG. 6 adopts the apparatus for policy routing in FIG. 1, the method for policy routing of the present disclosure includes the following steps: firstly, configuring the policy routing to the LSP, and saving forwarding information; then, refreshing the forwarding information while policy routing for the LSP through a timer trigger mode or a LSP unit trigger mode, in which the LSP unit trigger mode is adopted in this embodiment; and forwarding the packet according to the forwarding information while policy routing for the LSP. If a certain port employs a LDP FRR, that is, the port has a backup port, a backup LSP is established at the port, and the corresponding backup LSP of the port may be selected by displaying the configured policy routing to the LSP through commands. The backup LSP is utilized in this embodiment.

Figure 7:
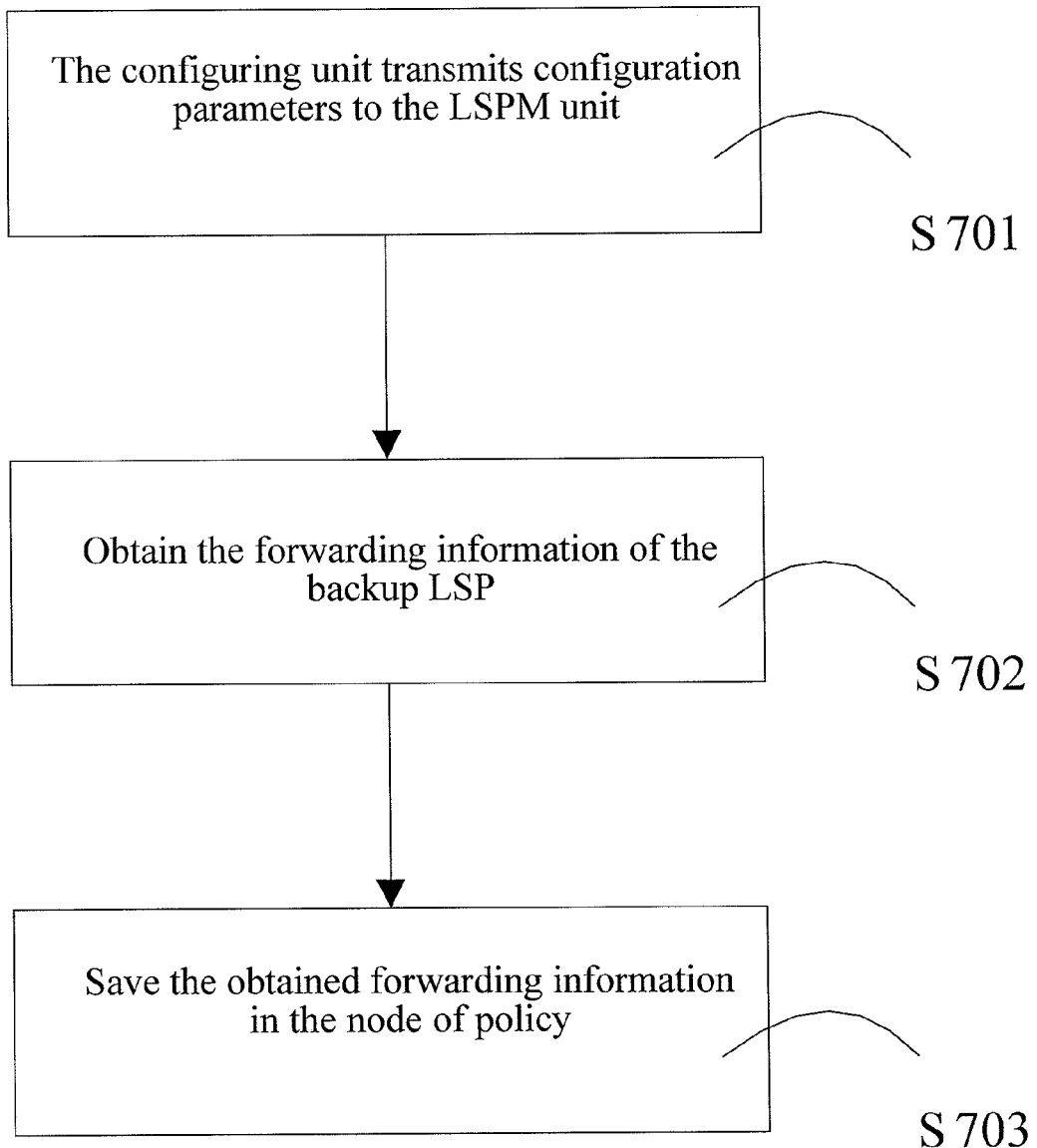
FIG. 7 is a flow chart of configuring a policy routing to a LSP, according to a second embodiment.

The present disclosure configures the policy routing to the LSP on the ingress provider edge router PE1. It is assumed that the packet is configured to be transmitted from the ingress provider edge router PE1 to the intermediate provider router P1, then from the intermediate provider router P1 to the egress provider edge router PE2, and then from the egress provider edge router PE2 to the destination client edge router CE2, the configuration flow thereof is shown in FIG. 7. Referring to FIG. 7, the present disclosure includes the following steps.

In S701, a configuring unit transmits configuration parameters to the LSPM unit. That is, the configuring unit 13 transmits an address of the destination client edge router CE2, an address of the egress provider edge router PE2, an address of the intermediate provider router P1, and a parameter indicating whether the backup LSP is utilized or not to the LSPM unit 11.

In S702, forwarding information of the backup LSP is obtained. That is, according to the address of the egress provider edge router PE2, the address of the intermediate provider router P1, and the information indicating whether the backup LSP is utilized or not, the configuring unit 13 obtains an outer label, a forwarding egress, and next-hop information of the backup LSP from the LSPM unit 11, and then, according to the address of the destination client edge router CE2, the configuring unit 13 obtains inner label information of the backup LSP from the route managing unit 12.

In S703, the obtained forwarding information is saved in the node of policy. That is, the outer label, the forwarding egress, and the next-hop information of the backup LSP obtained from the LSPM unit 11 and the inner label information of the backup LSP obtained from the route managing unit 12 are saved in the ingress provider edge router PE1.

Figure 8:
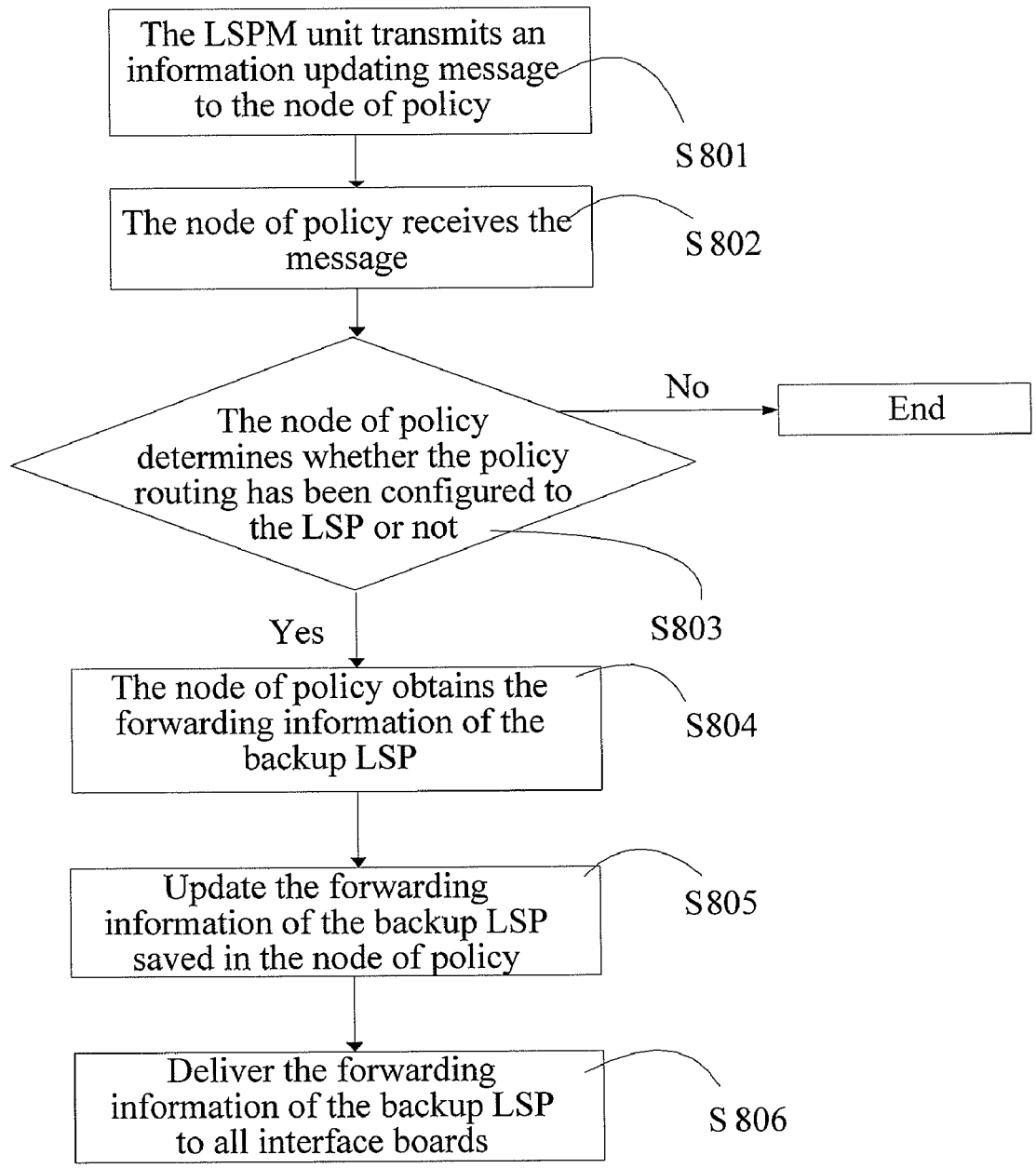
FIG. 8 is a flow chart of refreshing forwarding information of policy routing to the LSP, according to the second embodiment.

In order to enhance the packet forwarding efficiency, sufficient forwarding information while policy routing for the LSP needs to be saved, and the forwarding information dynamically changes with the changing of the network status. Therefore, when the network status is changed, the forwarding information of policy routing to the LSP needs to be refreshed accordingly. FIG. 8 is a flow chart of refreshing the forwarding information of policy routing to the LSP according to the present disclosure, which employs the LSP unit trigger mode. Referring to FIG. 8, the present disclosure includes the following steps.

In S801, the LSPM unit transmits an information updating message to the node of policy. That is, when the backup LSP is changed, the LSPM unit 11 transmits the information updating message to the ingress provider edge router PE1, and notifies the ingress provider edge router PE1 to update the forwarding information of the backup LSP saved therein.

In S802, the node of policy receives the message. That is, the ingress provider edge router PE1 receives the information updating message transmitted by the LSPM unit 11.

In S803, the node of policy determines whether the policy routing has been configured to the LSP or not. That is, the ingress provider edge router PE1 determines whether the policy routing has been configured to the LSP or not; if yes, the flow proceeds to Step S804, and otherwise, the flow is ended.

In S804, the node of policy obtains the forwarding information of the backup LSP. That is, the ingress provider edge router PE1 obtains the outer label, the forwarding egress, and the next-hop information of the backup LSP from the LSPM unit 11, and then obtains the inner label information of the backup LSP from the route managing unit 12.

In S805, the forwarding information of the backup LSP saved in the node of policy is updated. That is, according to the outer label, the inner label, the forwarding egress, and the next-hop information of the backup LSP obtained in Step S804, the forwarding information maintaining unit 14 updates the forwarding information of the backup LSP saved in the ingress provider edge router PE1.

In S806, the forwarding information of the backup LSP is delivered to all interface boards.

Figure 9:
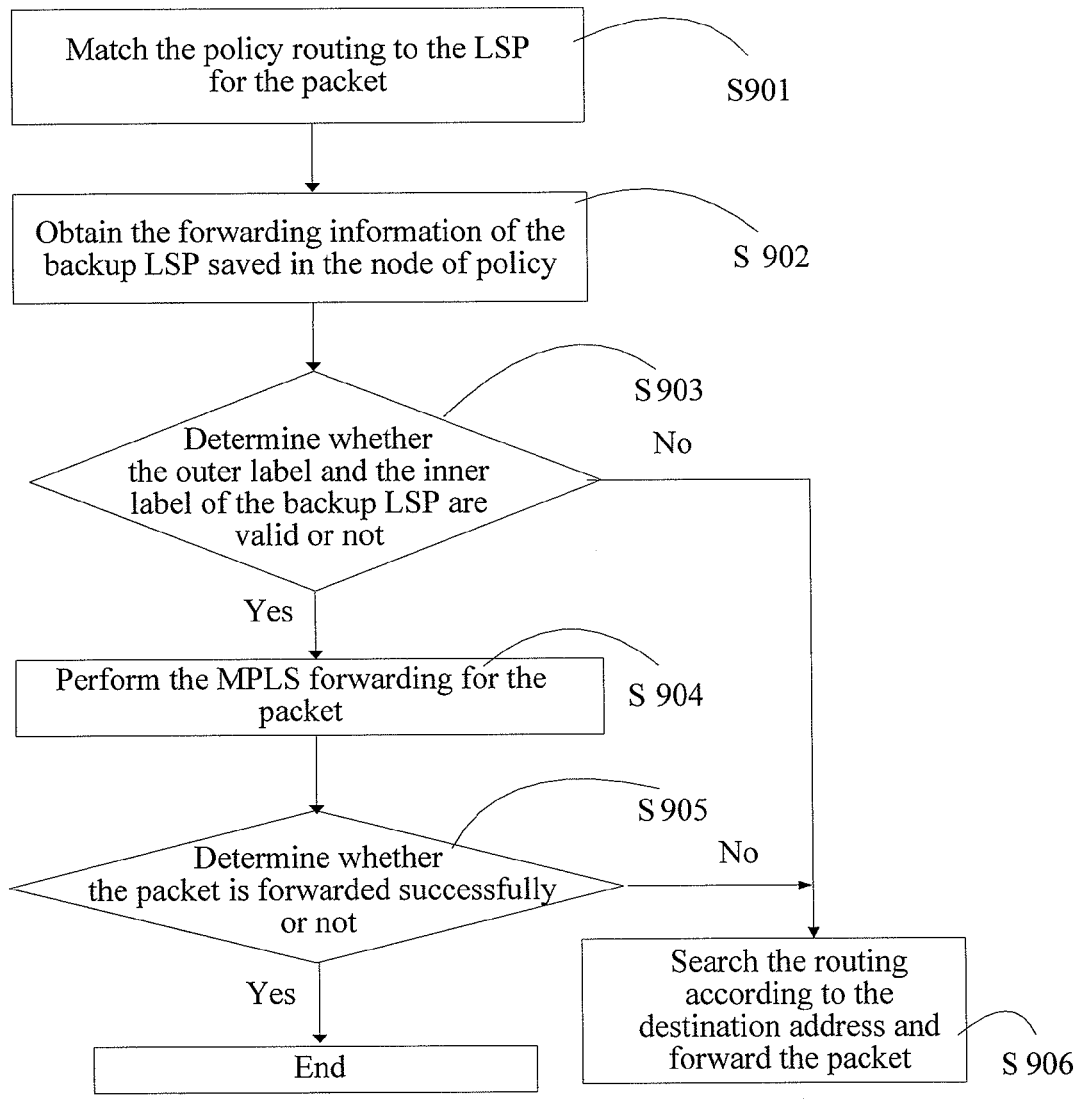
FIG. 9 is a flow chart of forwarding a packet, according to the second embodiment.

When the ingress provider edge router PE1 receives the packet transmitted by the source client edge router CE1, and is required to forward the packet, the present disclosure provides a packet forwarding flow, as shown in FIG. 9. Referring to FIG. 9, the present disclosure includes the following steps.

In S901, it matches the policy routing to the LSP for the packet. That is, according to the packet type, the packet size, and the source address, the configuring unit 13 matches the policy routing to the LSP, in which if it matches successfully, the flow proceeds to Step S902, and otherwise, it proceeds to Step S906.

In S902, the forwarding information of the backup LSP saved in the node of policy is obtained. That is, the saved outer label, the inner label, the forwarding egress, and the next-hop information of the backup LSP for the router are obtained from the ingress provider edge router PE1.

In S903, it is determined whether the outer label and the inner label of the backup LSP are valid or not; if yes, the flow proceeds to Step S904, and otherwise, it proceeds to Step S906.

In S904, the MPLS forwarding is performed for the packet. That is, the packet forwarding unit 15 forwards the packet from the ingress provider edge router PE1 to the intermediate provider router P1, then from the intermediate provider router P1 to the egress provider edge router PE2, and then from the egress provider edge router PE2 to the destination client edge router CE2.

In S905, it is determined whether the packet is forwarded successfully or not. If yes, the flow is ended, and otherwise, it proceeds to Step S906.

In S906, the routing is searched for according to a destination address, and the packet is forwarded.

Based on the above, the present disclosure not only efficiently supports the forwarding of MPLS packets, but also supports the forwarding of MPLS L3VPN private network packets. The policy routing to the LSP cannot only support the local router to select a next-hop and an outgoing interface, but also support all the subsequent forward paths of the packet. In addition, besides searching the routing table to forward an IP packet according to a destination address thereof, the present disclosure can further select a different LPS to forward the packet according to the packet type, the packet size, and the source address. In the present disclosure, the forwarding information of policy routing to the LSP is refreshed through a timer or LSPM unit trigger mode, which enhances the packet forwarding efficiency.

The aforementioned embodiments are merely preferred embodiments of the present disclosure. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims and their equivalents.

What is claimed is:

1. A method for policy routing, comprising:
    A. pre-configuring policy routing to a label switching path, obtaining and saving forwarding information;
    B. forwarding a packet according to the forwarding information; and
    C. refreshing the forwarding information of the policy routing to the label switching path;
    wherein the refreshing the forwarding information of the policy routing to the label switching path in Step C is implemented in a label switching path unit trigger mode and further comprises:
    C21. transmitting, by a label switching path managing unit, an information updating message to a node of policy;
    C22. determining, by the node of policy, whether a policy routing is configured to the label switching path or not according to the received information updating message; if yes, proceeding to Step C23, and otherwise, ending the process;
    C23. obtaining the forwarding information of the label switching path from the node of policy;
    C24. updating the forwarding information of the label switching path saved in the node of policy; and
    C25. delivering the forwarding information of the label switching path to interface boards.

2. The method for policy routing according to claim 1, wherein:
the obtaining and saving of forwarding information comprises:
A1. transmitting, by a configuring unit, configuration parameters to a label switching path managing unit;
A2. obtaining forwarding information of the label switching path, according to the configuration parameters; and
A3. saving the forwarding information in a node of policy.

3. The method for policy routing according to claim 1, wherein before forwarding a packet, the method further comprises:
B1. determining whether the packet satisfies matching conditions of policy routing to the label switching path or not; if yes, proceeding to Step B2, and otherwise, proceeding to Step B3;
B2. forwarding the packet according to forwarding information of policy routing to the label switching path; if forwarding the packet successfully, ending the process, and otherwise, proceeding to Step B3; and
B3. searching for a route according to a destination address and forwarding the packet.

4. The method for policy routing according to claim 1, wherein the label switching path in Step A is a backup label switching path.

5. A apparatus for policy routing, comprising:
a label switching path managing unit, configured to save first forwarding information of a label switching path, wherein the first forwarding information comprises: an outer label, a forwarding egress, and next-hop information of the label switching path;
a route managing unit, configured to save second forwarding information of the label switching path, wherein the second forwarding information comprises an inner label of the label switching path;
a configuring unit, connected to the label switching path managing unit and the route managing unit, respectively, configured to transmit configuration parameters to the label switching path managing unit, and obtain the first and/or second forwarding information of the label switching path from the label switching path managing unit and/or the route managing unit;
a forwarding information maintenance unit, connected to the label switching path managing unit, and configured to maintain the first and second forwarding information of the label switching path saved in a node of policy; and
a packet forwarding unit, configured to forward a packet.

6. The apparatus for policy routing according to claim 5, further comprising:
a hardware adaptation unit, connected to the label switching path managing unit and the route managing unit respectively, configured to provide hardware adaptation for the saved forwarding information of policy routing to the label switching path.

7. The method for policy routing according to claim 1, wherein a statistical count and an identifier of policy routing to the label switching path are added to the policy routing.

\* \* \* \* \*